(12) United States Patent
Liu et al.

(10) Patent No.: US 12,517,630 B2
(45) Date of Patent: Jan. 6, 2026

(54) ASSOCIATION SYSTEM OF PANEL CONTROLS FOR CALIBRATION SIGNALS, AND CALIBRATION SYSTEM AND METHOD

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 188 days.

(21) Appl. No.: 18/411,065

(22) Filed: Jan. 12, 2024

(65) Prior Publication Data

US 2025/0231667 A1    Jul. 17, 2025

(51) Int. Cl.
*G06F 3/0482* (2013.01)
*B60W 50/06* (2006.01)
(Continued)

(52) U.S. Cl.
CPC .......... *G06F 3/0484* (2013.01); *B60W 50/06* (2013.01); *G06F 9/451* (2018.02); *G07C 5/008* (2013.01); *G07C 5/0825* (2013.01)

(58) Field of Classification Search
CPC .... G06F 3/0484; G06F 9/451; G06F 3/04847; G06F 3/0482; G06F 3/04842;
(Continued)

(56) References Cited

U.S. PATENT DOCUMENTS

2016/0105484 A1    4/2016    Haas et al.
2018/0346301 A1*  12/2018    Myers .................. B66F 9/22
(Continued)

FOREIGN PATENT DOCUMENTS

CN    102749912 A    10/2012
CN    115657920 A     1/2023
(Continued)

OTHER PUBLICATIONS

CANoe Basic Tutorial 03: Analysis Window-Graphic Publihsed in 2023 by Yangwu Hang retrieved from: https://blog.csdn.net/weixin_43360025/article/details/132128445.*
(Continued)

*Primary Examiner* — Rinna Yi
(74) *Attorney, Agent, or Firm* — Bayramoglu Law Offices LLC

(57) ABSTRACT

An association system of panel controls for calibration signals, comprising: at least one bus adapter, configured to read calibration signals from a debugging device; at least one computer device, comprising a processor, a display communicating with the processor to present a panel setting interface, a readable storage medium, a communication bus, and a communication interface; wherein the processor is configured to read the calibration signals from the debugging device, and after reading the calibration signals, creating a corresponding mapping system variable for each calibration signal; selecting a mapping system variable corresponding to a calibration signal to be displayed and/or modified, and associating the selected mapping system variable with at least one panel control such that a value of the mapping system variable is displayed and/or modified on the panel control; when a calibration signal changes, changing the value of the mapping system variable corresponding to the calibration signal.

17 Claims, 7 Drawing Sheets

(51) Int. Cl.
  *G06F 3/0484* (2022.01)
  *G06F 9/451* (2018.01)
  *G07C 5/00* (2006.01)
  *G07C 5/08* (2006.01)
(58) Field of Classification Search
  CPC .. G06F 3/04855; G06F 3/0486; B60W 50/06; G07C 5/008; G07C 5/0825
  See application file for complete search history.

(56) References Cited

U.S. PATENT DOCUMENTS

| | | | |
|---|---|---|---|
| 2023/0002040 A1* | 1/2023 | Covington | G01L 3/109 |
| 2023/0196850 A1* | 6/2023 | Weiland | G07C 5/0808 |
| | | | 701/29.2 |

FOREIGN PATENT DOCUMENTS

| | | |
|---|---|---|
| CN | 116974222 A | 10/2023 |
| CN | 117171042 A | 12/2023 |
| CN | 117171044 A | 12/2023 |
| JP | H06290074 A | 10/1994 |
| JP | 2003099022 A | 4/2003 |
| RU | 2592711 C1 | 7/2016 |

OTHER PUBLICATIONS

Shanghai Tongxing Intelligent Technology Co., Ltd., TSMaster Application Note 2: How to use the XCP module for calibration, 2022, pp. 1-9, retrieved from: https://www.elecfans.com/d/2117850.html.

Tosun, Practical Sharing | How to implement multi-language switching in the TSMaster panel and toolbox, 2023, pp., retrieved from: https://blog.csdn.net/TOSUN_CAN/article/details/134398458.

Bilibili Tosun, TSMaster Panel Entry 1, 2021, pp. 1-56, retrieved from: https://www.bilibili.com/video/av419643447/?vd_source=6f16db266c6118b6b403bb7cc6d8d6d9.

Tosun, TSMaster Panel Entry 1, 2021, pp. 1-56, retrieved from: https://v.youku.com/v_show/id_XNTE5MTUwMDU1Ng==.html.

Yixing Technology, How to use the VX1000 family for ECU calibration, 2022, pp. 1-16, retrieved from: https://zhuanlan.zhihu.com/p/572133394.

Lyz_707, Asynchronous functions (async), 2018, pp. 1-5, retrieved from: https://blog.csdn.net/lyz_707/article/details/82079196.

Eefocus_3781508, What is the difference between asynchronous and synchronous, 2024, pp. 1-6, retrieved from: https://www.eefocus.com/ask/1535839.html.

* cited by examiner

ASSOCIATION SYSTEM OF PANEL CONTROLS FOR CALIBRATION SIGNALS, AND CALIBRATION SYSTEM AND METHOD

TECHNICAL FIELD

The present disclosure relates the field of calibration technologies and in particular to an association method and system of panel controls for calibration signals, a computer readable storage medium and an electronic device.

BACKGROUND

When a vehicle calibration tool is used, a graphics window of the calibration tool may be used to view a measurement variable and a stimulation window of the calibration system may be used to modify a calibration variable.

However, in many cases, a user needs to design, on its own, an interface for viewing, monitoring and modifying operations, for example, add a measurement variable and a calibration variable in which the user is interested to the interface at the same time. In many occasions, it is also required to add multiple same measurement variables in a same interface. These measurement variables have different measurement modes, for example, some are displayed in graphics and some are displayed in values. In this case, there is one problem as follows: it is impossible to, as desired by the user, place the measurement variable and the calibration variable in a same page for the purpose of layout even by using the graphics window or stimulation window of the calibration system, that is, it is difficult for the user to use the user-designed interface to measure and modify signals in the calibration system.

SUMMARY

The present disclosure provide an association system of panel controls for calibration signals, comprising:
- at least one bus adapter, configured to read calibration signals from a debugging device;
- at least one computer device, comprising a processor, a display communicating with the processor to present a panel setting interface, a readable storage medium, a communication bus and a communication interface; wherein,
- the processor, the readable storage medium and the communication interface communicate with the bus adapter via the communication bus so as to read the calibration signals from the debugging device;
- the readable storage medium is configured to store an instruction program;
- the processor is configured to, after reading the calibration signals, execute the instruction program to perform the operations of: creating a corresponding mapping system variable for each calibration signal; selecting a mapping system variable corresponding to a calibration signal to be displayed and/or modified, and associating the selected mapping system variable with at least one panel control such that a value of the mapping system variable is displayed and/or modified on the panel control; when a calibration signal changes, changing the value of the mapping system variable corresponding to the calibration signal; and when a value of a mapping system variable changes, changing the values displayed on all the panel controls associated with the mapping system variable accordingly;

the display is configured to display at least one panel control and a value displayed on the panel control through the panel setting interface.

The summary of the present disclosure aims to provide brief descriptions for the subjects of the specification. Thus, it should be understood that the above features are only illustrative and shall not be interpreted as narrowing the scope or essence of the subject of the specification in any way.

Other features, aspects and advantages of the subjects of the present disclosure will become apparent by way of the specific embodiments, drawings and claims.

DETAILED DESCRIPTION OF THE EMBODIMENTS

Figures 1, 2, 3:
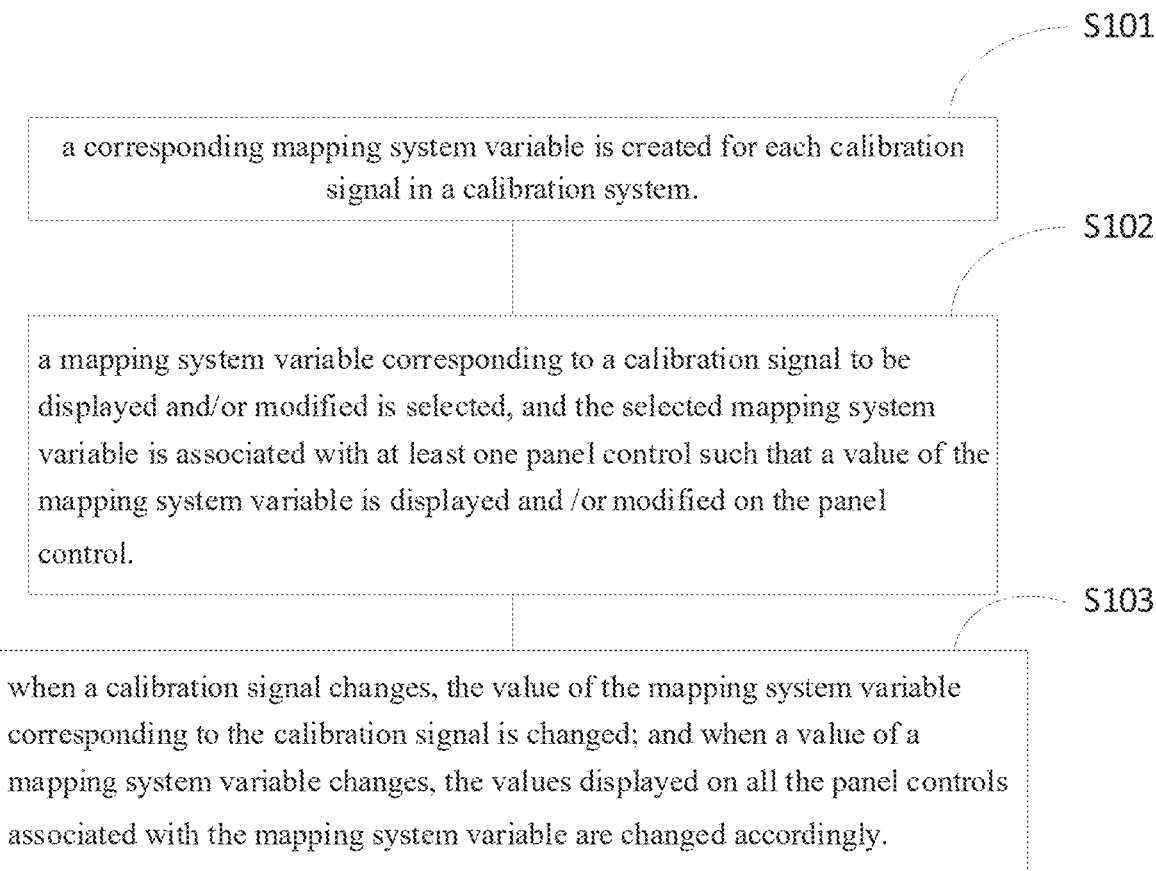
FIG. 1 is a step diagram illustrating an association method of panel controls for calibration signals according to one or more embodiments of the present disclosure.
FIG. 2 is a schematic diagram illustrating some cases of an association method of panel controls for calibration signals according to one or more embodiments of the present disclosure.
FIG. 3 is a schematic diagram illustrating some cases of an association method of panel controls for calibration signals according to one or more embodiments of the present disclosure.

In order to more clearly describe the technical solutions in the embodiments of the present disclosure or in the prior arts, the drawings required for descriptions of the specific embodiments or the prior arts will be briefly introduced. Apparently, the drawings described hereunder are only some embodiments of the present disclosure. Those skilled in the arts can obtain other drawings based on these drawings without making creative work.

When a vehicle calibration tool is used, a graphics window of the calibration tool may be used to view a measurement variable and a stimulation window of the calibration system may be used to modify a calibration variable.

However, in many cases, a user needs to design, on its own, an interface for viewing, monitoring and modifying operations, for example, add a measurement variable and a calibration variable in which the user is interested to the interface at the same time. In many occasions, it is also required to add multiple same measurement variables in a same interface. These measurement variables have different measurement modes, for example, some are displayed in graphics and some are displayed in values. In this case, there is one problem as follows: it is impossible to, as desired by the user, place the measurement variable and the calibration variable in a same page for the purpose of layout even by using the graphics window or stimulation window of the calibration system, that is, it is difficult for the user to use the user-designed interface to measure and modify signals in the calibration system.

As a result, one or more embodiments provide an association method of panel controls for calibration signals, which includes:

creating a corresponding mapping system variable for each calibration signal of a calibration system;

selecting a mapping system variable corresponding to a calibration signal to be displayed and/or modified, and associating the selected mapping system variable with at least one panel control such that a value of the mapping system variable is displayed and/or modified on the panel control;

when a calibration signal changes, changing the value of the mapping system variable corresponding to the calibration signal; and when a value of a mapping system variable changes, changing the values displayed on all the panel controls associated with the mapping system variable accordingly.

Specifically, multiple panel controls may be displayed in a same interface. The user may freely design his own user interface and based on the designed user interface, display and modify the calibration signals. When calibrating a chassis braking system, the user may design multiple user interfaces, for example, a basic braking system operation interface, an ABS system operation interface, and a VDC system operation interface and the like. The user may perform measurement and parameter optimization on a single system on a corresponding operation interface while being free from the influence of other system signals. In this way, the calibration efficiency can be improved and the possibility of error can be reduced.

Various non-limiting implementations of the embodiments of the present disclosure will be detailed below in combination with drawings.

As shown in FIG. 1, one or more embodiments provide an association method of panel controls for calibration signals, which includes the following steps.

At step S101, a corresponding mapping system variable is created for each calibration signal.

At step S102, a mapping system variable corresponding to a calibration signal to be displayed and/or modified is selected, and the selected mapping system variable is associated with at least one panel control such that a value of the mapping system variable is displayed and/or modified on the panel control.

At step S103, when a calibration signal changes, the value of the mapping system variable corresponding to the calibration signal is changed; and when a value of a mapping system variable changes, the values displayed on all the panel controls associated with the mapping system variable are changed accordingly.

In some embodiments, each calibration signal is located in a calibration system and the above association method of panel controls for calibration signals is implemented in the calibration system.

In some embodiments, the selected mapping system variable is associated with at least one read-write-type panel control for modification and at least one monitor-type panel control for displaying.

Specifically, the read-write-type panel controls refer to that these panel controls can not only display the value of the mapping system variable corresponding to a calibration signal but also modify the value of the mapping system variable corresponding to a calibration signal; the monitor-type panel controls refer to that these panel controls can be used only to display the value of the mapping system variable corresponding to a calibration signal.

In some embodiments, the above association method of panel controls may be applied to the calibration systems in the technical fields of vehicles, aerospace, and ships.

In some embodiments, a value displayed on one of the read-write-type panel controls is modified on the read-write-type panel control to trigger the change of the calibration signal.

A method of modifying a value displayed on one of the read-write-type panel controls on the read-write-type panel control to trigger the change of the calibration signal will be detailed below with a vehicle case.

As shown in FIG. 2, a corresponding mapping system variable ECU1 Factor is created for a calibration signal Factor of a wheel speed sensor, and an input/output box control in a panel associated with the mapping system variable ECU1 Factor is set, where an initial value displayed on the input/output box control is assumed to be 3.

Now, it is required to modify the value of the ECU1.Factor calibration variable to 5. As shown in FIG. 3, it is only required to change the displayed value 3 in the edit box to 5 and press enter, so as to trigger the change of the calibration signal Factor.

In some other embodiments, a method of modifying a value displayed on one of the read-write-type panel controls on the read-write-type panel control to trigger the change of the calibration signal includes:

associating an assignment function to one asynchronous function, wherein the assignment function is a write function of the mapping system variable associated with the panel control of a to-be-modified displayed value;

when the value displayed on the panel control is modified, distributing, by the asynchronous function, a write command and a read command to the calibration system, and then returning immediately, wherein the call of the asynchronous function is completed.

When the write command and the read command are successfully executed at the same time, a last-stored value of the mapping system variable is refreshed into a to-be-modified displayed value.

A method of modifying a valued displayed on one panel control to trigger the change of the calibration signal will be detailed below with a vehicle case.

If a value of a front axle wheel radius pre-stored in the vehicle ABS system is 0.298 meters during the calibration of the vehicle ABS system, it is required to write the value of the calibration signal WheelRadius_HA as 0.336 via the panel control, so as to set the front axle wheel radius to 0.336 meters.

Firstly, a corresponding mapping system variable named "WheelRadius_HA" is created for the calibration signal WheelRadius_HA of the front axle wheel radius in the calibration system.

By the user-designed panel, the input/output box control is associated with the mapping system variable "WheelRadius_HA", such that in a calibration process, the user may modify the value of the calibration signal WheelRadius_HA of the front axle wheel radius via the input/output box control.

Next, the user starts a test and the calibration system is connected to an ABS system via a bus adapter and associates an assignment function of the mapping system variable "WheelRadius_HA" to one asynchronous function "set_sys_var_async", wherein the asynchronous function functions to call the API function of the calibration system to execute the write and read operations of the calibration signal of the front axle wheel radius.

When the user inputs the value 0.336 in the input/output box control and presses enter, the calibration system may call the asynchronous function "set_sys_var_async" to introduce the target value "0.336" as a parameter. In the asynchronous function, the following requests are initiated one after another to the calibration system by asynchronous mode:

(1) a request of writing the calibration signal "WheelRadius_HA": the request carries the write value 0.336 such that the write value generated by the association method of panel controls for calibration signals is distributed to a debugging device via the bus adapter.

(2) a request of reading the calibration signal "WheelRadius_HA":

after the calibration system initiates a request, there is no need to wait for a request result but return from the asynchronous function "set_sys_var_async" immediately. The calibration system will write the calibration signals "WheelRadius_HA" in sequence at the back-stage and read the calibration signals "WheelRadius_HA".

When the calibration signal is successfully written into the ABS system, it is then read by the calibration system to the mapping system variable "WheelRadius_HA", and the input/output box control then immediately displays the value of the mapping system variable "WheelRadius_HA". If the write is successful, the input/output box control displays "0.336"; if the write is unsuccessful, it means the value of the corresponding mapping system variable is unchanged, i.e. the initial value 0.298, and thus, the input/output box control displays "0.298".

In some embodiments, the change of the calibration signal is triggered by a running environment of a vehicle-mounted Electronic Control Unit (ECU).

A method of triggering the change of the calibration signal by the running environment of the vehicle-mounted ECU will be detailed below with a vehicle case.

In the vehicle ABS system, a current PCurr of a pump motor is a measurement variable calibration signal for a calibration system. When the ABS system does not work, the current value is 0; when the ABS system is in a working state, the pump motor is started and the value of the measurement variable calibration signal "PCurr" read by the calibration system at this time is a real-time current value of the pump motor, for example, 8.3 A. When the current value changes, the value of the measurement variable calibration signal "PCurr" read by the calibration system may change accordingly.

In some embodiments, a method of associating the selected mapping system variable with at least one panel control includes:
- associating each mapping system variable with one notification list, wherein each entry in the notification list is linked to a corresponding panel control; and,
- a method of, when the value of the mapping system variable changes, accordingly changing the values displayed on all the panel controls associated with the mapping system variable includes:
- when the value of the mapping system variable changes, notifying an engine to call the notification list and send a change notification to each entry in the notification list, such that the corresponding panel control updates the displayed value based on the change notification.

The method of associating the selected mapping system variable with at least one panel control will be detailed below with a vehicle case. Thus, one interface can both the display-type controls and the write-type controls, such that the process of setting signals and the process of measuring the signals after the signal setting can be completed in one interface. In this way, the calibration efficiency can be increased and the cases of errors occurring to the measurement or modification due to interface switching can be reduced. The specific descriptions are made below.

When calibration is performed on a vehicle ECU1, a corresponding mapping system variable "ECU1.Factor" is created for the calibration signal Factor of the wheel speed sensor.

Figures 4, 5, 6, 7:
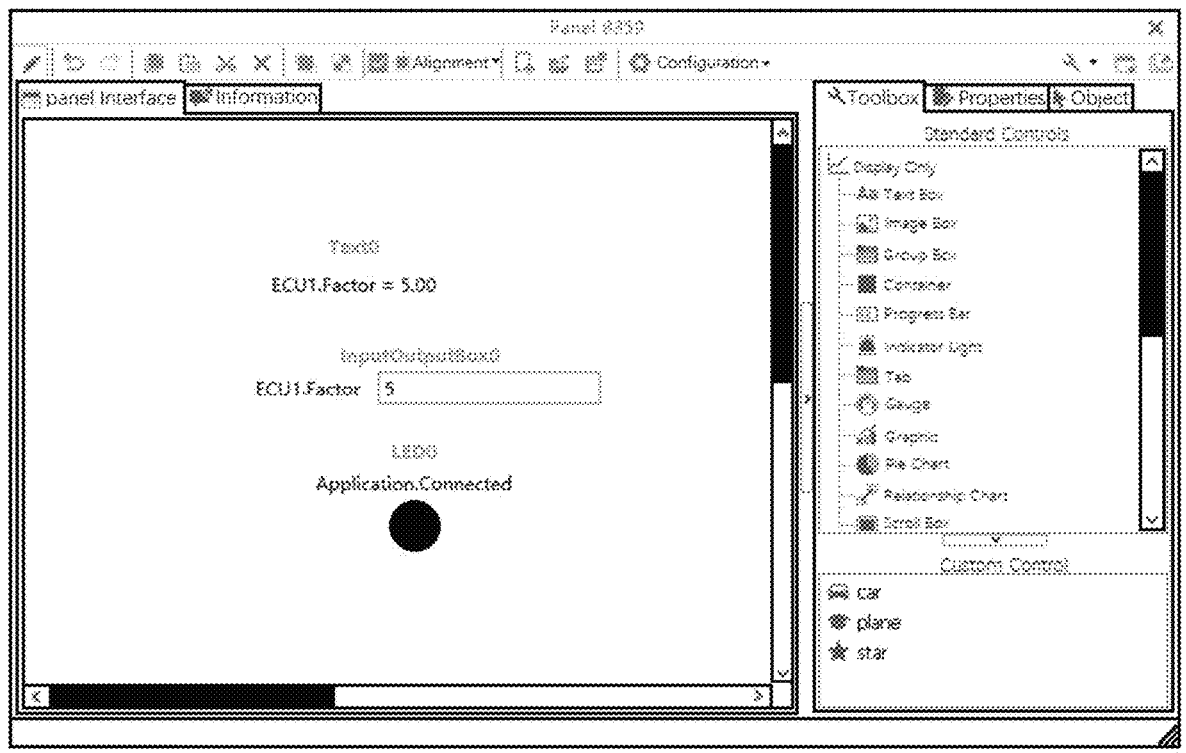
FIG. 4 is a schematic diagram illustrating some cases of an association method of panel controls for calibration signals according to one or more embodiments of the present disclosure.
FIG. 5 is a schematic diagram illustrating a text box control of an association method of panel controls for calibration signals according to one or more embodiments of the present disclosure.
FIG. 6 is a schematic diagram illustrating a progress bar control of an association method of panel controls for calibration signals according to one or more embodiments of the present disclosure.
FIG. 7 is a schematic diagram illustrating an indicator lamp control of an association method of panel controls for calibration signals according to one or more embodiments of the present disclosure.

As shown in FIG. 4, one text box control is then added on the panel and associated with the mapping system variable "ECU1.Factor" to display its real-time value; at the same time, one input/output box control is added on the panel and also associated with the mapping system variable "ECU1.Factor" to modify its value by hand. Furthermore, one indicator lamp control is added on the panel and associated with the mapping system variable "Application.Connected" to indicate whether an application program is connected.

In this case, there are a total of two mapping system variables associated with the panel controls. The mapping system variable "ECU1.Factor" is associated with two panel controls: the text box control and the input/output box control. The mapping system variable is associated with one notification list containing two entries, where the entry 1 is linked to the text box control and the entry 2 is linked to input/output box control. The mapping system variable "Application.Connected" is associated with one panel control: the indicator lamp control. The mapping system variable is also associated with one notification list containing only one entry, where the entry is linked to the indicator lamp control.

When the user connects with the application program, the value of the mapping system variable "Application.Connected" is changed from 0 to 1, which triggers notification to an engine to call the notification list of the mapping system variable, so as to update the values displayed on the panel controls in the notification list, namely, turn on the indicator lamps in the notification list.

When the user starts the calibration system, if the mapping system variable "ECU1.Factor" is refreshed into the initial value 5 of the corresponding calibration signal in the ECU1 after being successfully connected, notification is triggered to an engine to update the value displayed on the text box control and the value displayed on the input/output box control in the notification list of the mapping system variable, enabling both of the values to be displayed as 5.

When the user changes the value from 5 to 10 on the input/output box control of the panel, the value of the corresponding mapping system variable "ECU1.Factor" is also changed to 10, as required by the above method. At this time, notification is triggered to an engine to update the value displayed on the text box control and the value displayed on the input/output box control in the notification list of the mapping system variable, enabling both of the values to be displayed as 10.

In some embodiments, the panel control includes a monitor-type control and a read-write-type control.

Specifically, the monitor-type control includes but not limited to: a text box control, a progress bar control, an indicator lamp control, an instrument control, a graphics control, a pie chart control and a relationship graph control and the like.

As shown in FIG. 5, the text box control may display a real-time value of the calibration signal.

As shown in FIG. 6, the progress bar control may display, in real time, a size of the signal in the form of progress bar.

As shown in FIG. 7, the indicator lamp control may display a state of two values of the signal in the form of indicator lamp being turned on or off.

Figure 8:
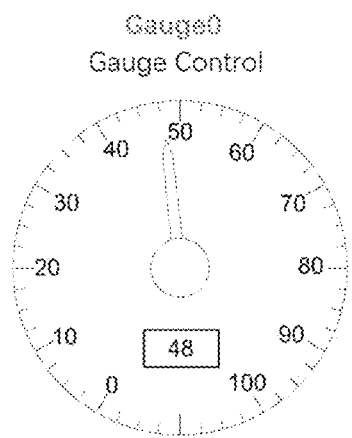
FIG. 8 is a schematic diagram illustrating an instrument control of an association method of panel controls for calibration signals according to one or more embodiments of the present disclosure.

As shown in FIG. 8, the instrument control may display a real-time value of the signal in the form of dial pointer.

Figure 9:
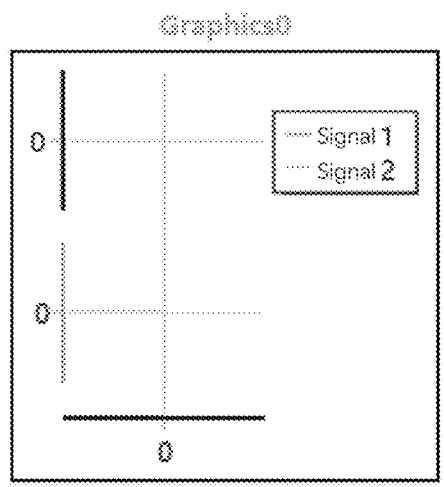
FIG. 9 is a schematic diagram illustrating a graphics control of an association method of panel controls for calibration signals according to one or more embodiments of the present disclosure.

As shown in FIG. 9, the graphics control may display a real-time change curve of single signal or multiple signals.

Figure 10:
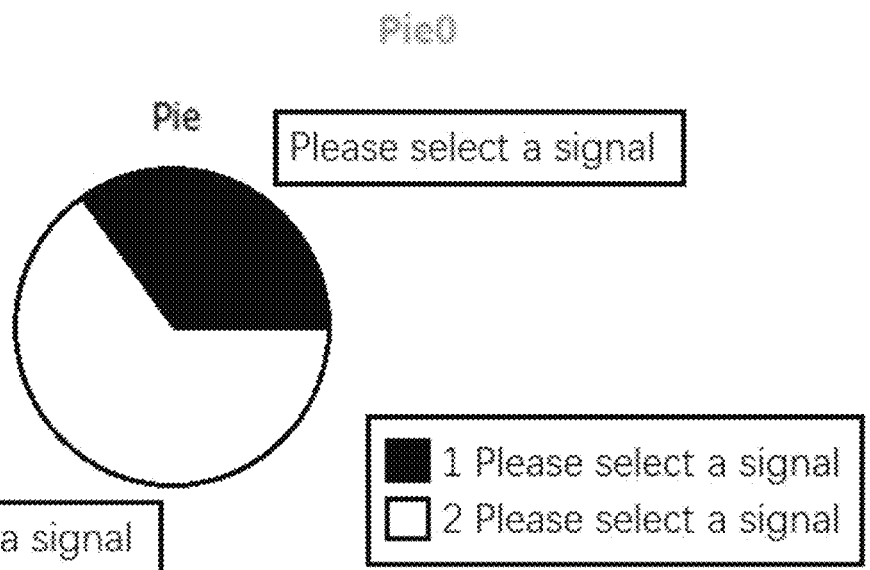
FIG. 10 is a schematic diagram illustrating a pie chart control of an association method of panel controls for calibration signals according to one or more embodiments of the present disclosure.

As shown in FIG. 10, the pie chart control may display a comparison relationship of two signals in size.

Figure 11:
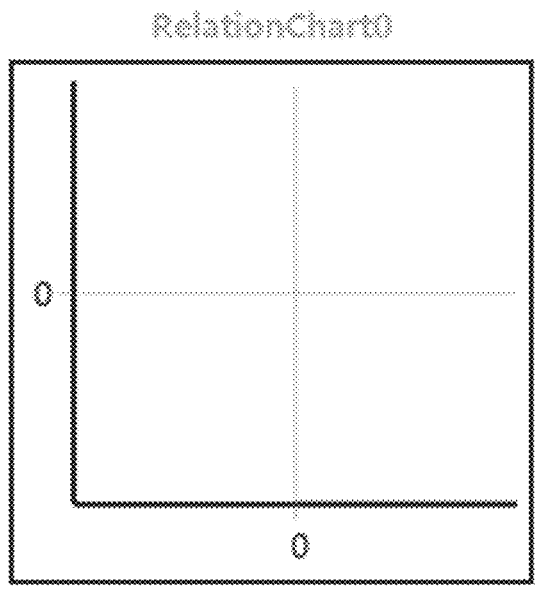
FIG. 11 is a schematic diagram illustrating a relationship graph control of an association method of panel controls for calibration signals according to one or more embodiments of the present disclosure.

As shown in FIG. 11, the relationship graph control may display a relationship curve of the values of two signals.

Specifically, the read-write-type control may include but not limited to: a path button control, a check box control, a track bar control, a scroll bar control, an input/output box control, an image button control, a selector control, a button control, a radio box control, a switch control and a multi-line text control and the like.

Figure 12:
FIG. 12 is a schematic diagram illustrating a path button control of an association method of panel controls for calibration signals according to one or more embodiments of the present disclosure.

As shown in FIG. 12, the path button control may display a state of two preset values of the signals with two different colors. When the user clicks the control with left button, the value of the calibration signal may be modified to a first preset value; when the user clicks the control with right button, the value of the calibration signal may be modified to a second preset value.

Figure 13:
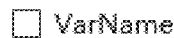
FIG. 13 is a schematic diagram illustrating a check box control of an association method of panel controls for calibration signals according to one or more embodiments of the present disclosure.

As shown in FIG. 13, the check box control may display a state of two preset values of the signals by ticking or un-ticking. When the user ticks the control, the value of the calibration signal may be modified to a first preset value; when the user un-ticks the control, the value of the calibration signal may be modified to a second preset value.

Figure 14:
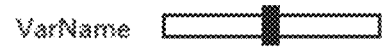
FIG. 14 is a schematic diagram illustrating a track bar control of an association method of panel controls for calibration signals according to one or more embodiments of the present disclosure.

As shown in FIG. 14, the track bar control may update a position of a track bar to display a state of the signals within an interval. When the user changes the position of the track bar, the value of the calibration signal can be modified in real time to a value corresponding to the track bar.

Figure 15:
FIG. 15 is a schematic diagram illustrating a scroll bar control of an association method of panel controls for calibration signals according to one or more embodiments of the present disclosure.

As shown in FIG. 15, the scroll bar control may update a position of a scroll bar to display a state of the signals within an interval. When the user changes the position of the scroll bar, the value of the calibration signal can be modified in real time to a value corresponding to the scroll bar.

Figure 16:
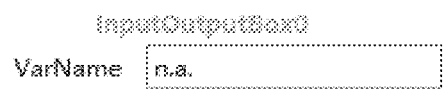
FIG. 16 is a schematic diagram illustrating an input and output box control of an association method of panel controls for calibration signals according to one or more embodiments of the present disclosure.

As shown in FIG. 16, the input/output box control may display a value of the signals in the form of text. When the user modifies a value in a text box and presses enter, the value of the calibration signal can be modified to a user-set value.

Figure 17:
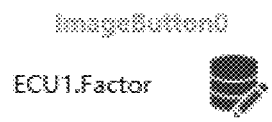
FIG. 17 is a schematic diagram illustrating an image button control of an association method of panel controls for calibration signals according to one or more embodiments of the present disclosure.

As shown in FIG. 17, the image button control may display a group of continuous integer preset values of the signals in the form of image switching. When the user clicks the control with left button, the preset value can be increased to a maximum preset value while the calibration variable is updated; the user clicks the control with right button, the preset value can be decreased to 0 while the calibration variable is updated.

Figure 18:
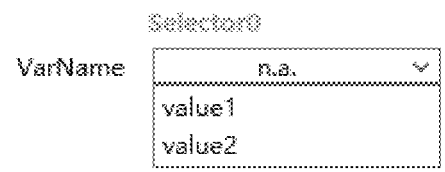
FIG. 18 is a schematic diagram illustrating a selector control of an association method of panel controls for calibration signals according to one or more embodiments of the present disclosure.

As shown in FIG. 18, the selector control may display a group of preset values of the signals in the form of list entry switching. When the user selects one entry from a list, the value of the calibration variable is set to a preset value corresponding to the entry.

Figure 19:
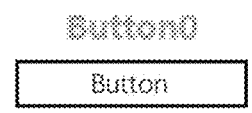
FIG. 19 is a schematic diagram illustrating a button control of an association method of panel controls for calibration signals according to one or more embodiments of the present disclosure.

As shown in FIG. 19, the button control may, when the user clicks a button, set the value of the calibration variable to a preset value of the button.

Figure 20:
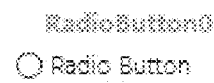
FIG. 20 is a schematic diagram illustrating a radio box control of an association method of panel controls for calibration signals according to one or more embodiments of the present disclosure.

As shown in FIG. 20, the radio box control may, when the value of the calibration variable is equal to a preset value of a radio box, display a selected state, and otherwise, display a non-selected state. When the user selects the radio box, the value of the calibration variable may be set to a preset value of the radio box.

Figure 21:
FIG. 21 is a schematic diagram illustrating a switch control of an association method of panel controls for calibration signals according to one or more embodiments of the present disclosure.

As shown in FIG. 21, the switch control may display two preset values of the calibration variable by two display modes on and off. When the user switches between on and off states, the value of the calibration variable may be set using the corresponding preset value.

Figure 22:
FIG. 22 is a schematic diagram illustrating a multi-line text control of an association method of panel controls for calibration signals according to one or more embodiments of the present disclosure.

As shown in FIG. 22, the multi-line text control is specially used to display a calibration variable of character string type. When the user modifies a character string in a multi-line text, the user may set the value of the calibration variable of character string type at the same time.

Figure 23:
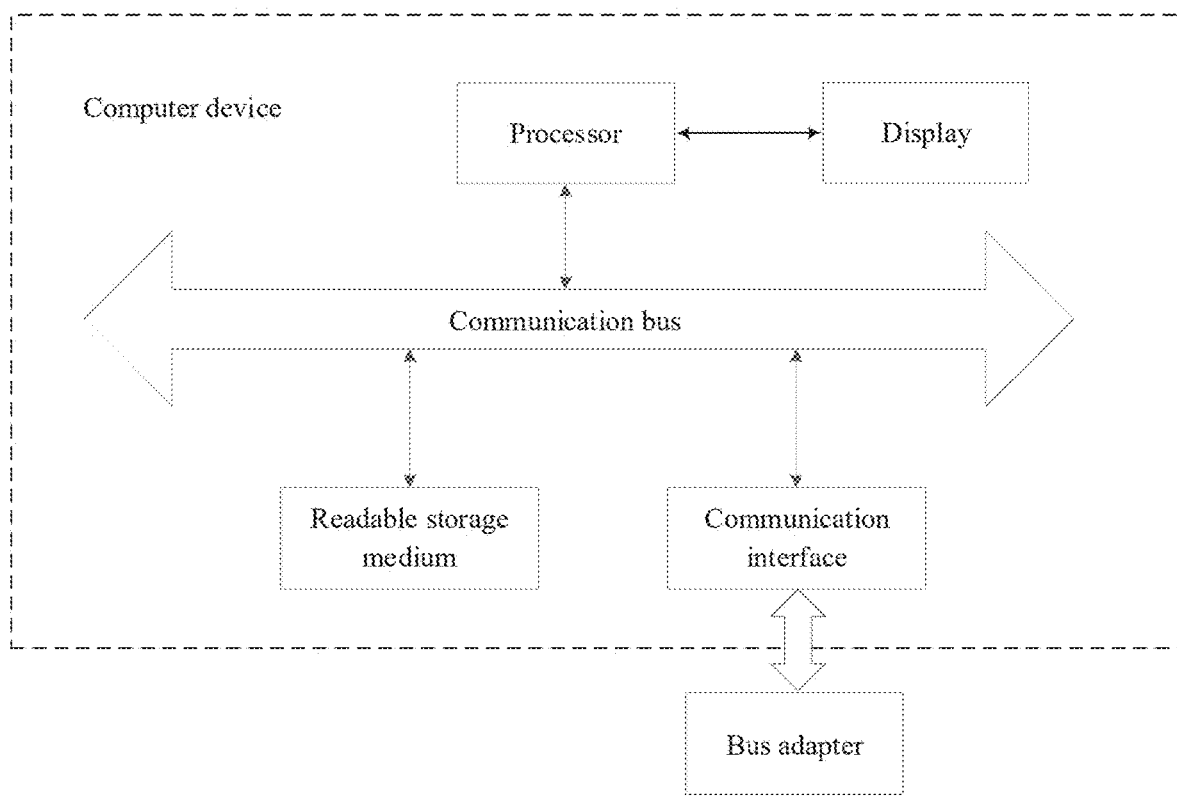
FIG. 23 is a principle block diagram illustrating an association system of panel controls for calibration signals according to one or more embodiments of the present disclosure.

As shown in FIG. 23, one or more embodiments further provide an association system of panel controls for calibration signals, which includes: at least one bus adapter, configured to read calibration signals from a debugging device;
at least one computer device, including a processor, a display communicating with the processor to present a panel setting interface, a readable storage medium, a communication bus and a communication interface; where,
the processor, the readable storage medium and the communication interface communicate with the bus adapter via the communication bus so as to read calibration signals from a debugging device;
the readable storage medium is configured to store an instruction program;
the processor is configured to, after reading the calibration signals, execute the instruction program to perform the operations of; creating a corresponding mapping system variable for each calibration signal; selecting a mapping system variable corresponding to a calibration signal to be displayed and/or modified, and associating the selected mapping system variable with at least one panel control such that a value of the mapping system variable is displayed and/or modified on the panel control; when a calibration signal changes, changing the value of the mapping system variable corresponding to the calibration signal; and when a value of a mapping system variable changes, changing the values displayed on all the panel controls associated with the mapping system variable accordingly;
the display is configured to display at least one panel control and a value displayed on the panel control through the panel setting interface.

Figure 24:
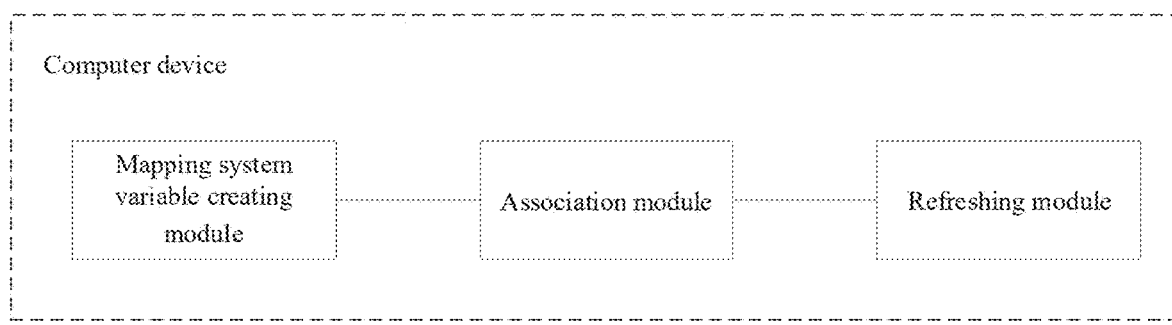
FIG. 24 is a principle block diagram illustrating an association system of panel controls for calibration signals according to one or more embodiments of the present disclosure.

As shown in FIG. 24, one or more embodiments further provide an association system of panel controls for calibration signals, including a computer device, configured to execute a mapping system variable creating module, an association module and a refreshing module, where,
the mapping system variable creating module is configured to create a corresponding mapping system variable for each calibration signal;
the association module is configured to select a mapping system variable corresponding to a calibration signal to be displayed and/or modified, and associate the selected mapping system variable with at least one panel control such that a value of the mapping system variable is displayed and/or modified on the panel control;
the refreshing module is configured to, when a calibration signal changes, change the value of the mapping system variable corresponding to the calibration signal; and when a value of a mapping system variable changes, change the values displayed on all the panel controls associated with the mapping system variable accordingly.

Computer instructions corresponding to the specific implementation functions of the mapping system variable creating module, the association module and the refreshing module are stored in the computer readable storage medium and executed in the computer device. For details, reference may be made to the contents of the above association method of panel controls for calibration signals and no redundant descriptions are made herein.

The electronic device in the embodiments of the present disclosure will be described below from the angle of hardware processing.

The embodiments of the present disclosure do not limit the specific implementation of the electronic device.

Figure 25:
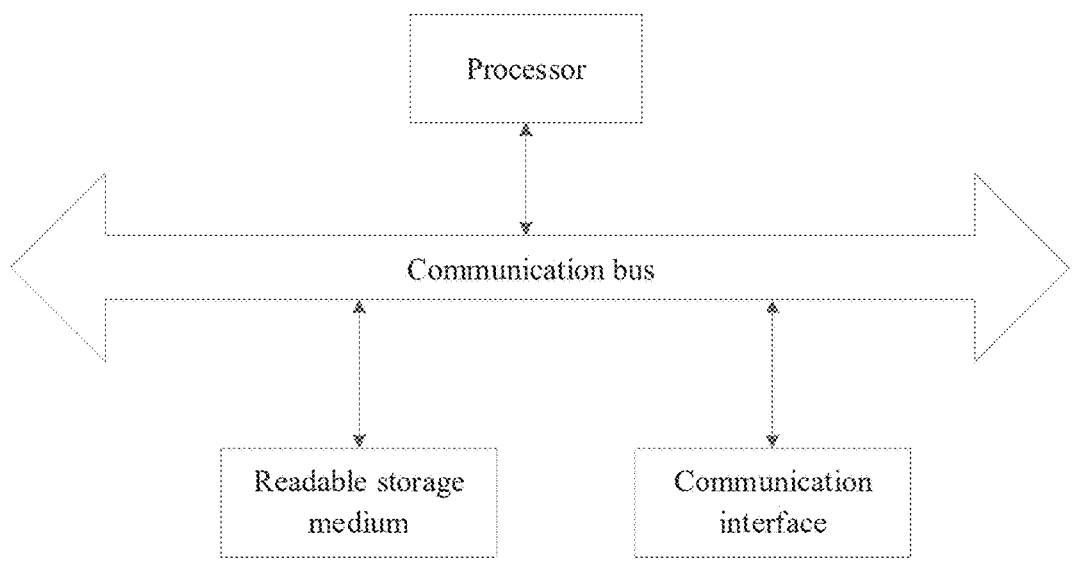
FIG. 25 is a principle block diagram illustrating an electronic device according to one or more embodiments of the present disclosure.

As shown in FIG. 25, the electronic device includes at least one processor, at least one readable storage medium storing instructions, a communication bus and a communication interface; where, the processor, the readable storage medium and the communication interface communicate with each other via the communication bus; the processor executes the instructions to perform the operations of: creating a corresponding mapping system variable for each calibration signal; selecting a mapping system variable corresponding to a calibration signal to be displayed and/or modified, and associating the selected mapping system variable with at least one panel control such that a value of the mapping system variable is displayed and/or modified on the panel control; when a calibration signal changes, changing the value of the mapping system variable corresponding to the calibration signal; and when a value of a mapping system variable changes, changing the values displayed on all the panel controls associated with the mapping system variable accordingly.

Figure 26:
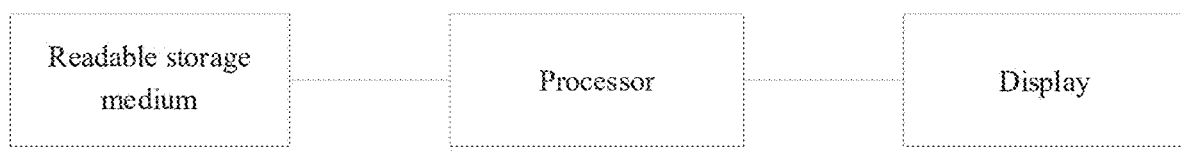
FIG. 26 is a principle block diagram illustrating an electronic device according to one or more embodiments of the present disclosure.

As shown in FIG. 26, one or more embodiments of the present disclosure further provide an electronic device, including a processor, a display communicating with the processor to present a panel setting interface and a readable storage medium; where,
the readable storage medium is configured to store an instruction program,
the processor is configured to execute the instruction program to perform the operations of: creating a corresponding mapping system variable for each calibration signal; selecting a mapping system variable corresponding to a calibration signal to be displayed and/or modified, and associating the selected mapping system variable with at least one panel control such that a value of the mapping system variable is displayed and/or modified on the panel control; when a calibration signal changes, changing the value of the mapping system variable corresponding to the calibration signal; and when a value of a mapping system variable changes, changing the values displayed on all the panel controls associated with the mapping system variable accordingly;

the display is configured to display at least one panel control and a value displayed on the panel control through the panel setting interface.

In some embodiments, the computer device, and the personal industrial computer may also be one of the electronic devices.

The structures shown in FIGS. 25 and 26 do not constitute any limitation to the electronic device and may include more or less components than shown or combine some components or have different component arrangements.

In some embodiments, the computer device, the industrial personal computer and apparatus may also be used as one of the electronic devices.

The structures shown in FIGS. 25 and 26 do not constitute any limitation to the electronic device, and the electronic device may further include more or less components than shown in the drawings or combine some components or have different component deployments.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as WI-FI interface, Bluetooth interface and the like), which is usually used to establish communication connection between the server and other computer devices.

The readable storage medium or the computer readable storage medium includes at least one type of memories. The memory includes flash memory, harddisk drive, multimedia card, card type memory (e.g. SD memory or the like), magnetic memory, magnetic disk or compact disk or the like. In some embodiments, the memory may be an internal storage unit in the computer device, for example, a harddisk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit in the computer device and the external storage device. The memory may be used to not only store an application software installed on the computer device and various types of data, for example, the codes of the computer programs and the like but also temporarily store data already output or to be output.

In some embodiments, the processor may be a central processing unit (CPU), a processor, a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

The processor executes the program to perform the steps in the embodiments of the association method of panel controls for calibration signals shown in FIG. 1, for example, the steps S101 to S103 shown in FIG. 1. Alternatively, the processor executes the computer program to implement the functions of the modules or units in the apparatus embodiments.

One or more embodiments of the present disclosure further provide a computer readable storage medium, configured to store programs of performing any one of the above association methods of panel controls for calibration signals.

One or more embodiments further provide a computer readable storage medium, storing computer readable instructions, where the computer readable instructions are executed by at least one processor to perform the above association method of panel controls for calibration signals, which specifically includes: creating a corresponding mapping system variable for each calibration signal; selecting a mapping system variable corresponding to a calibration signal to be displayed and/or modified, and associating the selected mapping system variable with at least one panel control such that a value of the mapping system variable is displayed and/or modified on the panel control; when a calibration signal changes, changing the value of the mapping system variable corresponding to the calibration signal; and when a value of a mapping system variable changes, changing the values displayed on all the panel controls associated with the mapping system variable accordingly. For details, reference may be made to the specific descriptions of the above association method of panel controls for calibration signals and no redundant descriptions are made herein.

One or more embodiments further provide a computer program product, including computer programs or instructions, where the computer programs or instructions are executed on a computer to cause the computer to perform any one of the above association methods of panel controls for calibration signals.

One or more embodiments further provide a computer program product which includes a computer readable storage medium, storing computer readable program codes, where the computer readable program codes include instructions which cause at least one processor or at least one computer device to perform the operations of:

creating a corresponding mapping system variable for each calibration signal;

selecting a mapping system variable corresponding to a calibration signal to be displayed and/or modified, and associating the selected mapping system variable with at least one panel control such that a value of the mapping system variable is displayed and/or modified on the panel control;

when a calibration signal changes, changing the value of the mapping system variable corresponding to the calibration signal; and when a value of a mapping system variable changes, changing the values displayed on all the panel controls associated with the mapping system variable accordingly.

For details, reference may be made to the specific descriptions of the above association method of panel controls for calibration signals and no redundant descriptions are made herein.

One or more embodiments further provide a calibration system, including:

a computer device and a bus adapter; where, the bus adapter is configured to read calibration signals from a debugging device;

the computer device includes a processor, a readable storage medium, a communication bus and a communication interface; where, the processor, the readable storage medium and the communication interface communicate with the bus adapter via the communication bus so as to obtain calibration signals;

the readable storage medium is configured to store an instruction program;

the processor is configured to execute the instruction program to perform the operations of: creating a corresponding mapping system variable for each calibration signal; selecting a mapping system variable corresponding to a calibration signal to be displayed and/or modified, and associating the selected mapping system variable with at least one panel control such that a value of the mapping system variable is displayed and/or modified on the panel control; when a calibration signal changes, changing the value of the mapping system variable corresponding to the calibration signal; and when a value of a mapping system variable changes, changing the values displayed on all the panel controls associated with the mapping system variable accordingly.

One or more embodiments further provide a calibration method, including:

reading calibration signals from a debugging device via a bus adapter;

after reading the calibration signals, creating a corresponding mapping system variable for each calibration signal; selecting a mapping system variable corresponding to a calibration signal to be displayed and/or modified, and associating the selected mapping system variable with at least one panel control such that a value of the mapping system variable is displayed and/or modified on the panel control; when a calibration signal changes, changing the value of the mapping system variable corresponding to the calibration signal; and when a value of a mapping system variable changes, changing the values displayed on all the panel controls associated with the mapping system variable accordingly;

displaying at least one panel control and a value displayed on the panel control via a panel setting interface.

One or more embodiments of the present disclosure further provide a calibration method, including:

reading calibration signals from a debugging device via a bus adapter;

by a computer device, communicating with the bus adapter to perform the above association method of panel controls for calibration signals, and distribute a write value generated by the above association method of panel controls for calibration signals to the debugging device via the bus adapter.

In some embodiments, the bus adapter may be a Controller Area Network (CAN) bus adapter, a Controller Area Network Flexible Data Rate (CANFD) bus adapter, a Fast Local Interconnect Network (FastLIN) bus adapter, a Local Interconnect Network (LIN) bus adapter, an Ethernet bus adapter, a FlexRay bus adapter, or may be one-to-many or many-to-many. In some other embodiments, no limitation is made to the specific implementation of the bus adapter.

In some embodiments, communication is performed with the debugging device, for example, vehicle Electronic Control Unit (ECU) and its relevant systems based on Unified Diagnostic Services (UDS), or Universal Measurement and Calibration Protocol (XCP) or CAN Calibration Protocol (CCP) protocol, so as to read calibration signals from the debugging device and distribute the write value generated by the above association method of panel controls for calibration signals to the debugging device.

In some embodiments, for the vehicles, the debugging device may specifically be a vehicle ECU and its relevant systems which include but not limited to Electric Power Steering System (EPS), Anti-lock Braking System (ABS), Electronic Stability Control (ESC), vehicle engine management system and Battery Management System (BMS) and the like, which can be connected to the computer device via a bus to achieve the corresponding processes.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as independent products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. An association system of panel controls of a vehicle for calibration signals, comprising:

at least one bus adapter, configured to read calibration signals from a debugging device;

at least one computer device, comprising a processor, a display communicating with the processor to present a panel setting interface, a readable storage medium, a communication bus, and a communication interface;

wherein the processor, the readable storage medium, and the communication interface communicate with the bus adapter via the communication bus to read the calibration signals from the debugging device;

the readable storage medium is configured to store an instruction program;

the processor is configured to, after reading the calibration signals, execute the instruction program to perform the operations of:

creating a corresponding mapping system variable for each calibration signal;

selecting a mapping system variable corresponding to a calibration signal to be displayed on the panel setting interface and/or modified, and associating the selected mapping system variable with one or more panel controls such that a value of the mapping system variable is displayed on the panel setting interface and/or modified on the panel control;

when a calibration signal changes, changing the value of the mapping system variable corresponding to the calibration signal; and when a value of a mapping system variable changes, changing the values displayed on all the panel controls, displayed on the panel setting interface, associated with the mapping system variable accordingly; and the display is configured to display one or more panel controls and a value displayed on the one or more panel controls through the panel setting interface;

associating each mapping system variable with one notification list, wherein each entry in the notification list is linked to a corresponding panel control; and when the value of the mapping system variable changes, notifying an engine to call the notification list and send a change notification to each entry in the notification list, such that the corresponding panel control updates the displayed value based on the change notification.

2. The association system according to claim 1, wherein the selected mapping system variable is associated with at least one read-write-type panel control for modification and at least one monitor-type panel control for displaying.

3. The association system according to claim 2, wherein a value displayed on one of the read-write-type panel controls is modified on the read-write-type panel control to trigger the change of the calibration signal.

4. The association system according to claim 3, wherein the modifying of the value displayed on one of the read-write-type panel controls on the read-write-type panel control to trigger the change of the calibration signal further comprises:

associating an assignment function to one asynchronous function, wherein the assignment function is a write function of the mapping system variable associated with the panel control of a to-be-modified displayed value; and when the value displayed on the panel control is modified, distributing, by the asynchronous function, a write command and a read command, and then returning immediately, wherein the call of the asynchronous function is completed.

5. The association system according to claim 4, wherein when the write command and the read command are successfully executed at the same time, a last-stored value of the mapping system variable is refreshed into a to-be-modified displayed value.

6. The association system according to claim 1, wherein the change of the calibration signal is triggered by a running environment of a debugging device.

7. A calibration system, comprising:

a computer device and a bus adapter;

wherein the bus adapter is configured to read calibration signals from a debugging device;

the computer device comprises a processor, a readable storage medium, a communication bus, and a communication interface;

wherein the processor, the readable storage medium, and the communication interface communicate with the bus adapter via the communication bus to read the calibration signals from the debugging device;

the readable storage medium is configured to store an instruction program; and the processor is configured to, after reading the calibration signals, execute the instruction program to perform the operations of:

creating a corresponding mapping system variable for each calibration signal;

selecting a mapping system variable corresponding to a calibration signal to be displayed on a panel setting interface via a display and/or modified, and associating the selected mapping system variable with one or more panel controls such that a value of the mapping system variable is displayed on the panel setting interface and/or modified on the panel control;

when a calibration signal changes, changing the value of the mapping system variable corresponding to the calibration signal; and when a value of a mapping system variable changes, changing the values displayed on all the panel controls, displayed on the panel setting interface, associated with the mapping system variable accordingly;

associating each mapping system variable with one notification list, wherein each entry in the notification list is linked to a corresponding panel control; and when the value of the mapping system variable changes, notifying an engine to call the notification list and send a change notification to each entry in the notification list, such that the corresponding panel control updates the displayed value based on the change notification.

8. The calibration system according to claim 7, wherein the selected mapping system variable is associated with at least one read-write-type panel control for modification and at least one monitor-type panel control for displaying.

9. The calibration system according to claim 8, wherein a value displayed on one of the read-write-type panel controls is modified on the read-write-type panel control to trigger the change of the calibration signal.

10. The calibration system according to claim 9, wherein the modifying of the value displayed on one of the read-write-type panel controls on the read-write-type panel control to trigger the change of the calibration signal further comprises:

associating an assignment function to one asynchronous function, wherein the assignment function is a write function of the mapping system variable associated with the panel control of a to-be-modified displayed value; and when the value displayed on the panel control is modified, distributing, by the asynchronous function, a write command and a read command, and then returning immediately, wherein the call of the asynchronous function is completed.

11. The calibration system according to claim 10, wherein when the write command and the read command are successfully executed at the same time, a last-stored value of the mapping system variable is refreshed into a to-be-modified displayed value.

12. The calibration system according to claim 7, wherein the change of the calibration signal is triggered by a running environment of the debugging device.

13. A calibration method for panel controls of a vehicle, comprising:
  reading calibration signals from a debugging device via a bus adapter;
  after reading the calibration signals, creating a corresponding mapping system variable for each calibration signal;
  selecting a mapping system variable corresponding to a calibration signal to be displayed on a panel setting interface and/or modified, and associating the selected mapping system variable with one or more panel controls such that a value of the mapping system variable is displayed on the panel setting interface and/or modified on the panel control;
  when a calibration signal changes, changing the value of the mapping system variable corresponding to the calibration signal; and
  when a value of a mapping system variable changes, changing the values displayed on all the panel controls, displayed on the panel setting interface, associated with the mapping system variable accordingly; and
  displaying one or more panel controls and a value displayed on the one or more panel controls via the panel setting interface on the display;
  associating each mapping system variable with one notification list, wherein each entry in the notification list is linked to a corresponding panel control; and
  when the value of the mapping system variable changes, notifying an engine to call the notification list and send a change notification to each entry in the notification list, such that the corresponding panel control updates the displayed value based on the change notification.

14. The calibration method according to claim 13, wherein the selected mapping system variable is associated with at least one read-write-type panel control for modification and at least one monitor-type panel control for displaying.

15. The calibration method according to claim 14, wherein a value displayed on one of the read-write-type panel controls is modified on the read-write-type panel control to trigger the change of the calibration signal.

16. The calibration method according to claim 15, wherein the modifying of the value displayed on one of the read-write-type panel controls on the read-write-type panel control to trigger the change of the calibration signal further comprises:
  associating an assignment function to one asynchronous function, wherein the assignment function is a write function of the mapping system variable associated with the panel control of a to-be-modified displayed value; and
  when the value displayed on the panel control is modified, distributing, by the asynchronous function, a write command and a read command, and then returning immediately, wherein the call of the asynchronous function is completed.

17. The calibration method according to claim 13, wherein the change of the calibration signal is triggered by a running environment of the debugging device.

* * * * *